(12) United States Patent
Menon et al.

(10) Patent No.: US 8,452,920 B1
(45) Date of Patent: May 28, 2013

(54) SYSTEM AND METHOD FOR CONTROLLING A DYNAMIC RANDOM ACCESS MEMORY

(75) Inventors: Raghavan Menon, Saratoga, CA (US); Raj Mahajan, Campbell, CA (US)

(73) Assignee: Synopsys Inc., Mountain View, CA (US)

( * ) Notice: Subject to any disclaimer, the term of this patent is extended or adjusted under 35 U.S.C. 154(b) by 524 days.

(21) Appl. No.: 12/346,856

(22) Filed: Dec. 31, 2008

Related U.S. Application Data

(60) Provisional application No. 61/018,344, filed on Dec. 31, 2007.

(51) Int. Cl.
*G06F 12/00* (2006.01)

(52) U.S. Cl.
USPC .................................. 711/108; 711/E12.078

(58) Field of Classification Search
None
See application file for complete search history.

(56) References Cited

U.S. PATENT DOCUMENTS

| | | | |
|---|---|---|---|
| 5,008,886 A | 4/1991 | Chinnaswamy et al. | |
| 5,394,535 A | 2/1995 | Ohuchi | |
| 5,404,482 A * | 4/1995 | Stamm et al. | 711/145 |
| 5,404,483 A * | 4/1995 | Stamm et al. | 711/144 |
| 5,602,999 A * | 2/1997 | Hyatt | 711/1 |
| 5,974,514 A | 10/1999 | Andrewartha et al. | |
| 6,230,235 B1 * | 5/2001 | Lu et al. | 711/106 |
| 6,718,444 B1 | 4/2004 | Hughes | |
| 6,748,484 B1 * | 6/2004 | Henderson et al. | 711/108 |
| 6,820,170 B1 * | 11/2004 | Elnathan et al. | 711/108 |
| 7,126,946 B2 * | 10/2006 | Beadle et al. | 370/390 |
| 7,185,141 B1 * | 2/2007 | James et al. | 711/108 |
| 7,283,380 B1 * | 10/2007 | Srinivasan et al. | 365/49.17 |
| 2006/0112321 A1 * | 5/2006 | Leung | 714/774 |
| 2007/0094450 A1 * | 4/2007 | VanderWiel | 711/133 |

OTHER PUBLICATIONS

Fay-Wolf, "How Computers Work: The CPU and Memory", Dec. 15, 2003, pp. 1 - 5, http://web.archive.org/web/20031215230244/http://homepage.cs.uri.edu/faculty/wolfe/book/Readings/Reading04.htm.*
Webopedia, "Controller", Apr. 5, 2001, pp. 1-2, http://web.archive.org/web/20010405223746/http://www.webopedia.com/TERM/C/controller.html.*
Microsoft, "Computer Dictionary", Fifth Edition, 2002, p. 445.*

* cited by examiner

*Primary Examiner* — Edward Dudek, Jr.
*Assistant Examiner* — Christopher Birkhimer
(74) *Attorney, Agent, or Firm* — Evergreen Valley Law Group, PC; Kanika Radhakrishnan

(57) ABSTRACT

A method of controlling a dynamic random access memory (DRAM) and a DRAM memory controller is provided. An example DRAM memory controller includes a content addressable memory (CAM) based decision control module. The CAM based decision control module includes a CAM access storage module, a next access table module, and a decision logic module. Further, the DRAM memory controller includes a DRAM access control interface. The method includes detecting a request for a read-modify-write operation. The method also includes creating a read access request and a write access request based on the detecting. Further, the method includes prioritizing the read access request and the write access request. Moreover, the method includes executing the read access request and the write access request based on the prioritizing.

20 Claims, 6 Drawing Sheets

SYSTEM AND METHOD FOR CONTROLLING A DYNAMIC RANDOM ACCESS MEMORY

CROSS REFERENCE TO RELATED APPLICATIONS

This patent application claims priority from provisional patent application No. "61/018,344" titled "Memory Controllers for Memory Devices", filed on Dec. 31, 2007 in the United States Patent and Trademark Office.

FIELD

The present disclosure relates to the field of dynamic random access memory (DRAM) used in electronic devices. More particularly, the present disclosure relates to controlling a DRAM.

BACKGROUND

Over a period of time use of memory devices in electronic systems has increased significantly. The memory devices form key components in most of electronic designs. The memory devices, for example, Dynamic Random Access Memory (DRAM) devices, are popular due to their low cost and high volume use. The low cost results from simple and regular structure of the DRAM devices which is easy to manufacture. The memory devices and access to the memory devices are controlled using memory controllers. The memory controllers may be interfaced with the memory devices. The memory controllers provide an access mechanism and implement various timing and control functions for the memory devices. The memory controllers are also offered as pre-designed Intellectual Property (IP) blocks. The more efficient an IP block is the more useful it is. The memory devices require several advanced features to achieve performance levels required by the electronic systems. The advanced features put additional requirements on the memory controllers and make it more difficult for a designer to create the memory controllers. Therefore, an efficient memory controller is required.

In order to increase processing speed of the electronic systems it is necessary to improve access time to the memory devices which in turn puts an additional requirement on the memory controllers. In a conventional memory controller implementation for a memory device an attempt to improve access time is made by taking a stream of access requests and optimizing the access requests to make sure that no access requests to the memory device are wasted. For example, addresses to a same section, such as a row, of a bank of the memory device can be made more quickly than accesses to any other row in the bank. However, only a few (usually just 2 or 3 accesses) optimizations can be made in such memory controller implementation due to the limitation to the length of the stream of the access requests. Further, the memory controller implementation makes use of a traditional state machine to make access priority decisions and the traditional state machine becomes unmanageably complex as multiple accesses are added to a decision mechanism. Hence, an efficient memory controller implementation is desired. Further, read-modify-write operations associated with the DRAM must also be handled.

In order to maximize performance in the electronic systems, it is important for the memory device and memory controller to provide both minimum latency and maximum memory bandwidth. Hence, a memory controller implementation that minimizes latency and maximizes bandwidth is desired.

SUMMARY

Embodiments of the present disclosure provide a method and system for controlling a dynamic random access memory (DRAM).

An example dynamic random access memory (DRAM) memory controller includes a content addressable memory (CAM) based decision control module for determining a next best access request for the DRAM. The CAM based decision control module includes a CAM access storage module for storing an access request and a read operation. The CAM based decision control module also includes a next access table module for storing the next best access request. The CAM based decision control module further includes a decision logic module for determining the next best access request based on results from the CAM access storage module and the next access table module, detecting a read-modify-write operation, and creating a read access request and a write access request. Further, the memory controller includes a DRAM access control interface for implementing signaling required to access the DRAM.

An example method of controlling a dynamic random access memory (DRAM) includes detecting a request for a read-modify-write operation. A read access request and a write access request are created based on the detecting. The read access request and the write access request can then be prioritized. Further, the read access request and the write access request are executed based on the prioritizing.

An example method of accessing a dynamic random access memory (DRAM) includes storing a plurality of access requests in a content addressable memory access storage module. A next best access request is then determined from the stored access requests. Further, the next best access request is then processed.

DETAILED DESCRIPTION OF THE EMBODIMENTS

Embodiments of the present disclosure provide a method and system for controlling a dynamic random access memory (DRAM).

Figure 1:
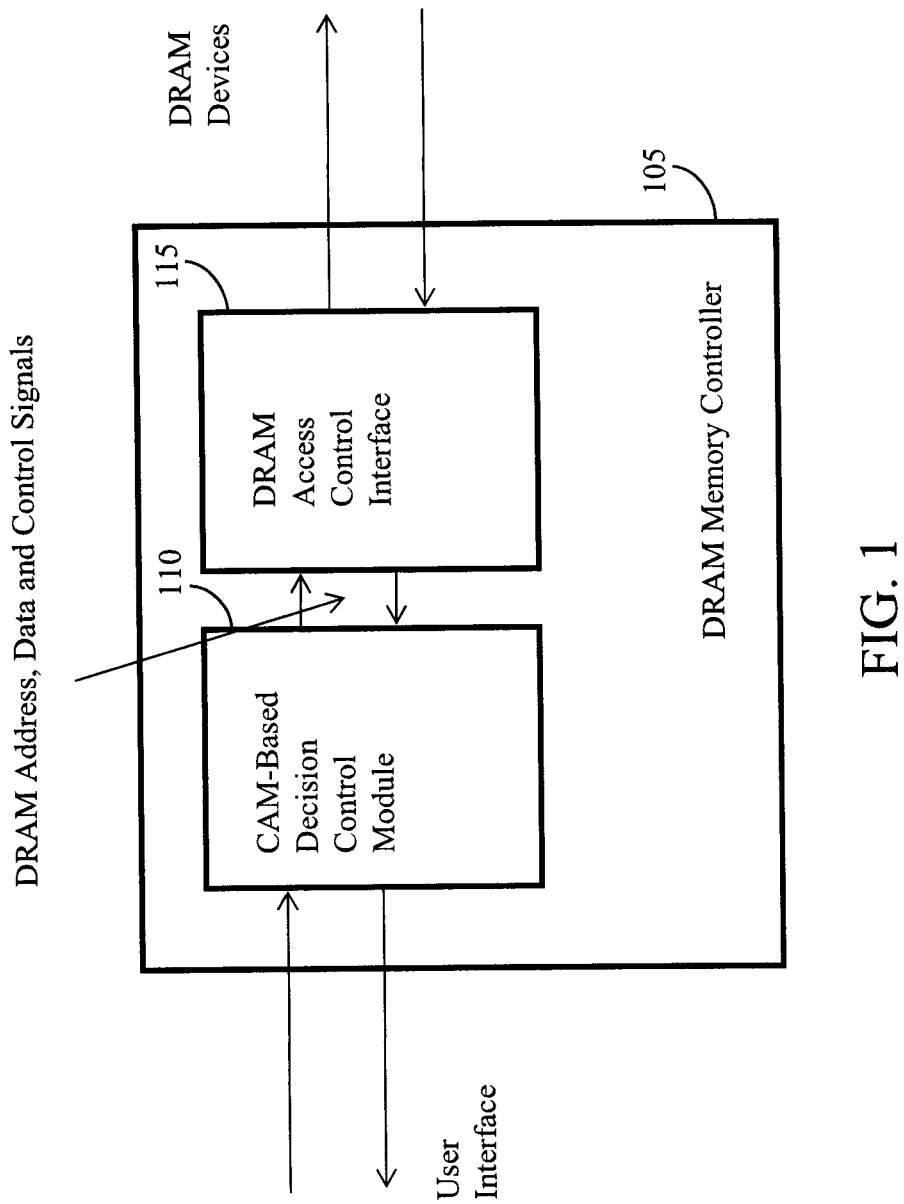
FIG. 1 is a block diagram of a DRAM memory controller in accordance with an embodiment of the invention.

FIG. 1 is a block diagram of a DRAM memory controller 105 in accordance with an embodiment of the invention. The DRAM memory controller 105 is interfaced with one or more memory devices. Examples of the one or more memory devices include but are not limited to Dynamic Random Access Memory (DRAM) devices, Synchronous Dynamic Random Access Memory (SDRAM) devices, and Double Data Rate Synchronous Dynamic Random Access Memory (DDR-SDRAM) devices. The one or more memory devices may be controlled by control logic of centralized DRAM memory controller 105. The DRAM memory controller 105 provides an access mechanism and implements various timing and control functions for the one or more memory devices.

In an embodiment, each memory device may include one or more memories and other sub-systems. Each memory may be organized into banks and rows, the rows herein referred to as pages. For example, a DRAM has four or eight banks. Within each bank a particular page may be accessed. Some accesses to the memory may be faster than others. For example, if the page is open or is ready to access then access time for the page is shorter than for other pages in the bank.

In an embodiment, the DRAM memory controller 105 is also interfaced with one or more users. The one or more users may make access requests from the DRAM memory controller 105 and the DRAM memory controller 105 may issue access commands for the one or more memory devices.

The content addressable memory (CAM) based architecture for the DRAM memory controller 105 allows a larger access stream to be used for optimization. The DRAM memory controller 105 includes hardware and algorithms that are used to select a best access for the one or more memory devices. Once the access is decided, the DRAM memory controller 105 then implements detailed timing and control signal sequences required to implement the access according to standard protocols of the one or more memory devices. The DRAM memory controller 105 includes one or more modules for providing an access mechanism and implementing various timing and control functions for the one or more memory devices.

The DRAM memory controller 105 includes a CAM based decision control module 110 and a DRAM access control interface 115. The CAM based decision control module 110 is interfaced with the one or more users via a user interface. In an embodiment, the decision control module 110 determines best next access for the one or more memory devices. The CAM based decision control module 110 optimizes an access stream and issues specific accesses to the DRAM access control interface 115.

In an embodiment, the DRAM access control interface 115 is in connection with the one or more memory devices. The DRAM access control interface 115 implements detailed signaling required to access the one or more memory devices. The DRAM access control interface 115 also creates specific signals and timing to control read and write process to the one or more memory devices.

The CAM based decision control module 110 includes one or more modules for performing different functions. The CAM based decision control module 110 including the one or more modules is explained in detail in conjunction with FIG. 2.

Figure 2:
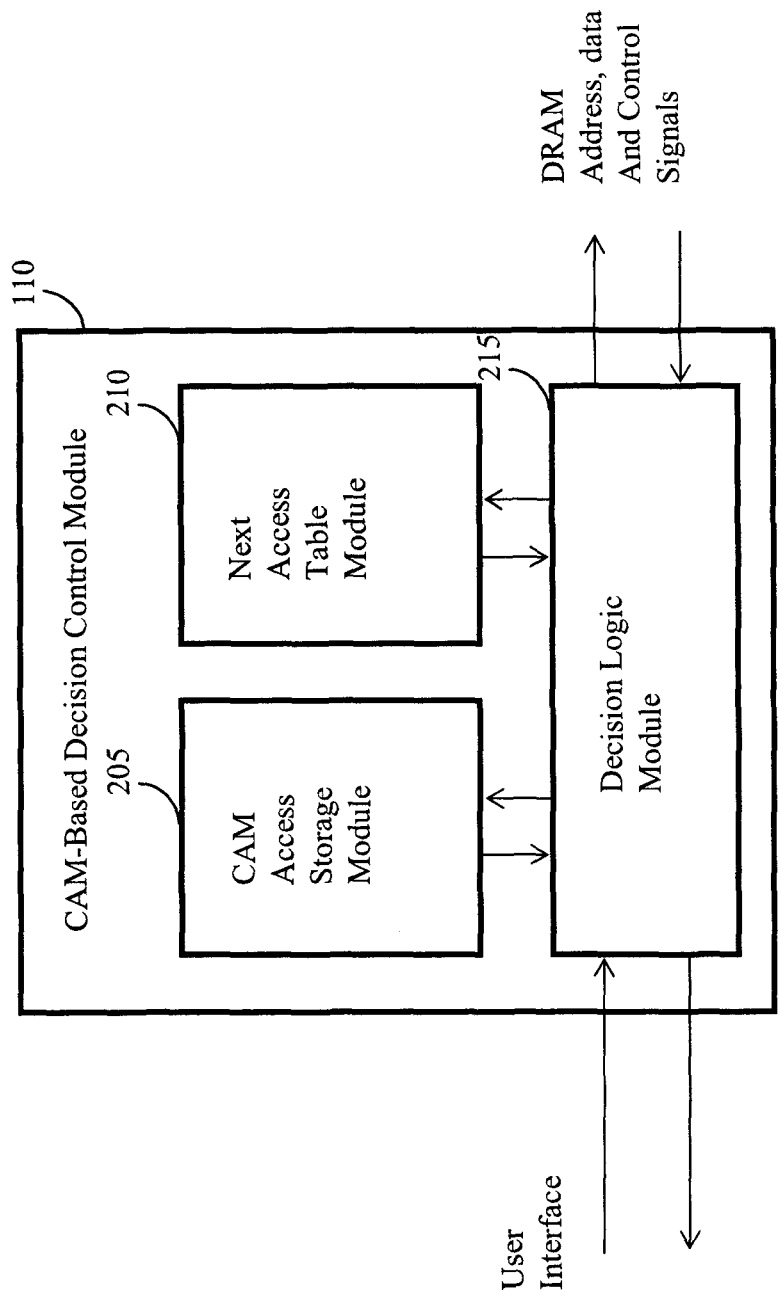
FIG. 2 is a block diagram of a content addressable memory (CAM) based decision control module in accordance with an embodiment of the invention.

FIG. 2 is a block diagram of the CAM based decision control module 110 in accordance with an embodiment of the invention. The CAM based decision control module 110 includes a CAM access storage module 205, a next access table module 210 and a decision logic module 215.

In an embodiment of the invention, the CAM access storage module 205 is used to store each access requested of the controller for the one or more memory devices. The next access table module 210 is used to store a current best access to a specific memory bank. The next access table module 210 is constantly updated when a new access request comes in by comparing the new request to the access requests in the next access table module 210. The CAM access storage module 205 and the next access table module 210 may store data in one or more fields.

In an embodiment of the invention, the decision logic module 215 determines the best access by implementing one or more algorithms. The decision logic module 215 uses results from the CAM access storage module 205 and the next access table module 210 to make the determination and includes a host of considerations. Examples of the host of considerations include but are not limited to age of the accesses in the CAM access storage module 205, order of the accesses, the number of accesses to an open bank and priority of the accesses. Various fields in the CAM access storage module 205 and the next access table module 210 may be searched using search capabilities of the CAM based architecture. Search results may then be used by the decision logic module 215 to determine which access is a best transaction to be processed by DRAM memory controller 105 for a specific bank.

In an embodiment of the invention, the decision logic module 215 determines the best access from the next access table module 210 and the results of comparisons with the CAM access storage module 205.

In an embodiment of the invention, a read-modify-write operation when using the CAM based decision control module 110 starts when the read-modify-write operation is requested by the one or more users. The decision logic module 215 detects the read-modify-write operation and creates a read access request and a write access request. The CAM access storage module 205 stores a read operation with some additional bits identifying that the read operation is coupled with an associated write command. In an embodiment of the invention, the additional bits include a write flag bit and an entry location for the associated write command in the CAM access storage module 205.

Figure 3:
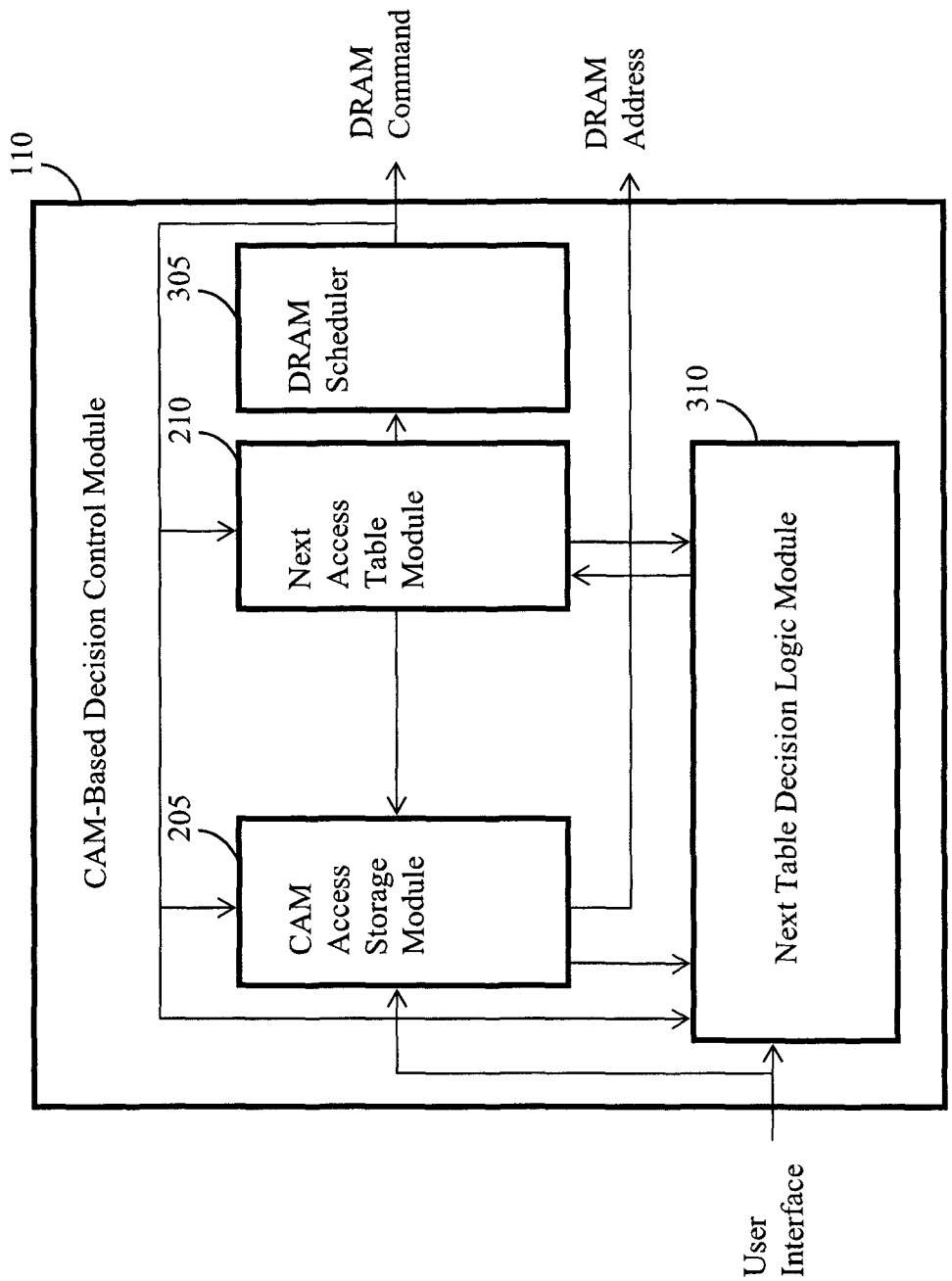
FIG. 3 is a block diagram of a content addressable memory (CAM) based decision control module in accordance with another embodiment of the invention.

FIG. 3 is a block diagram of the CAM based decision control module 110 in accordance with another embodiment of the invention. The CAM based decision control module 110 includes the CAM access storage module 205, the next access table module 210, a DRAM scheduler 305 and a next table decision logic module 310.

In an embodiment, the DRAM scheduler 305 implements a scheduling mechanism that schedules the access requests to the banks in an order as present in the next access table. Further, the DRAM scheduler 305 can be included in the next access table to schedule the access requests.

In an embodiment of the invention, the next table decision logic module 310 uses one or more algorithms to determine the best next access. It uses results from the CAM access storage module 205 and the next access table module 210 to make this determination and includes a host of considerations like the age of the accesses in the CAM access storage module 205, the order of the accesses, the number of accesses to the open bank and the priority of the access. The CAM access storage module 205 is used to store each access requested of the controller for the one or more memory devices.

Figure 4:
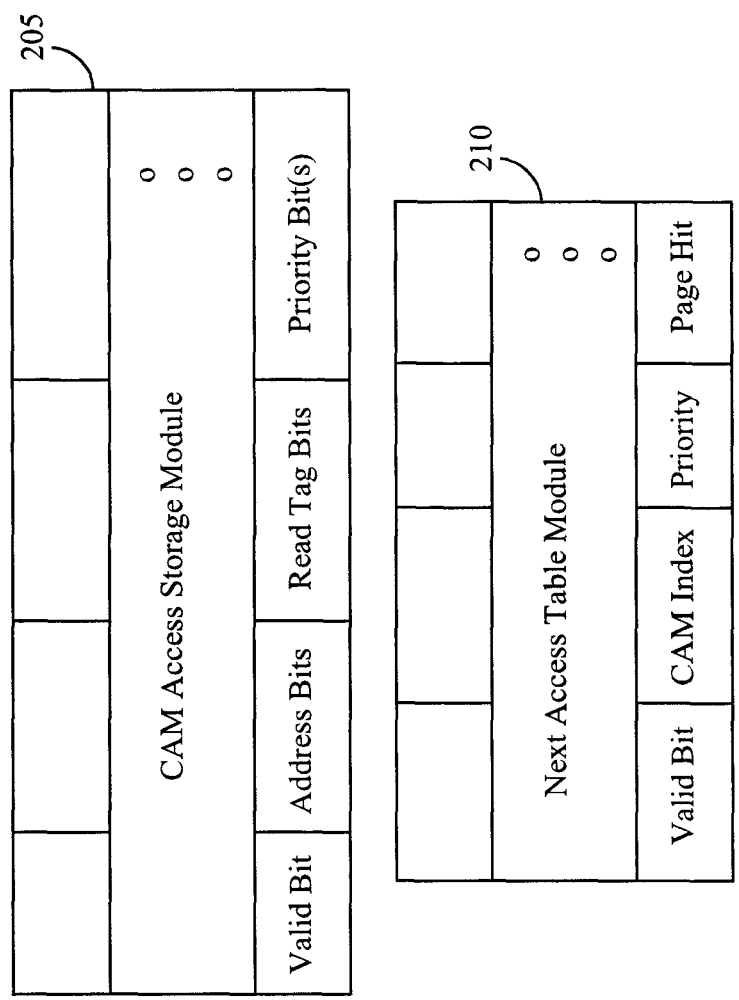
FIG. 4 is an exemplary representation of contents of a CAM access storage module and a next access table module.

FIG. 4 is an exemplary representation of contents of the CAM access storage module 205 and the next access table module 210.

Contents of the CAM access storage module 205 include one or more valid bits indicating if an entry is used or not, one or more address bits indicating a complete memory address, one or more read tag bits indicating an order of a requested read operation, one or more priority bits and complete next table information. In an embodiment of the invention, if there is a write operation then write data is also associated. The write data may be stored in conventional memory.

Contents of the next access table module 210 include one or more valid bits indicating if the entry is to be used, one or more priority bits indicating relative importance of an access, one or more page hit bits indicating if the access is within the open page, and an index into the contents of the CAM access storage module 205.

Figure 5:
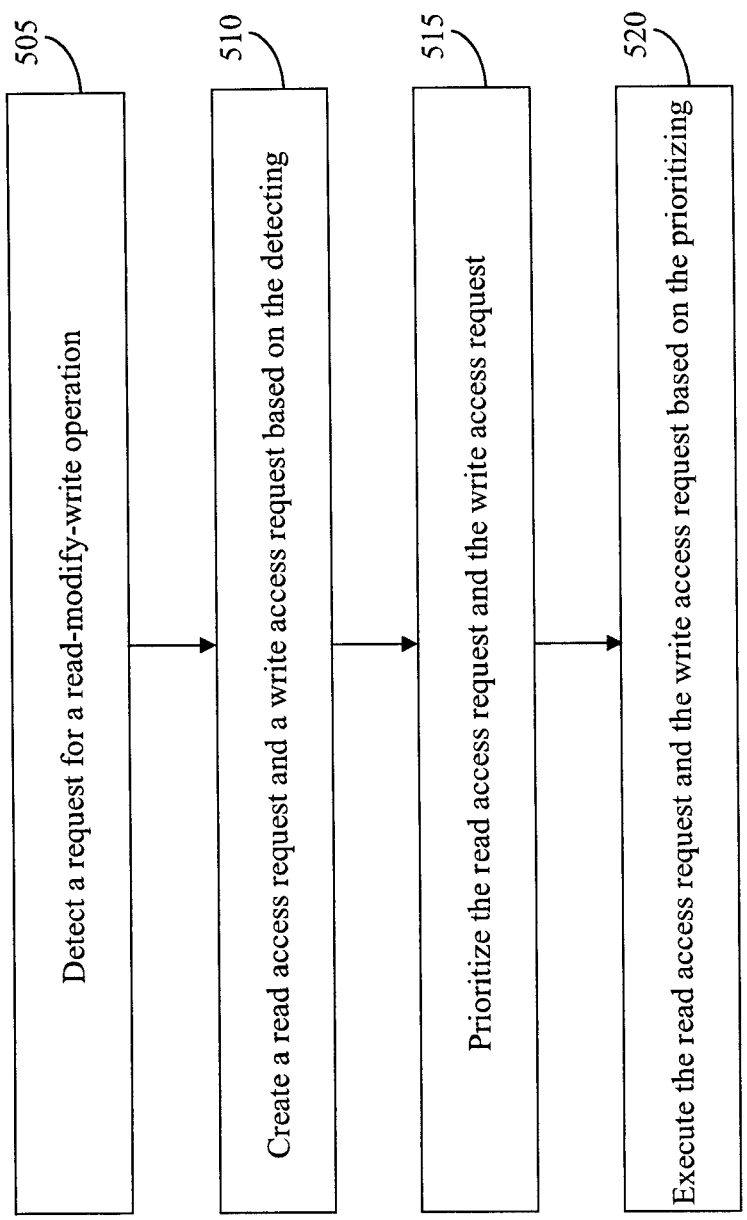
FIG. 5 illustrates a method of controlling a dynamic random access memory (DRAM)

FIG. 5 illustrates a method of controlling a dynamic random access memory (DRAM).

At step 505, a request for a read-modify-write operation is detected. The read-modify-write request can be requested over the user interface. When using the CAM based decision control module, the read-modify-write operation starts when a request for the read-modify-write operation is received. The decision control module detects the read-modify-write operation on receiving the request for the read-modify-write operation.

At step 510, a read access request and a write access request are created based on the detecting. Some examples when the read-modify-write operations are requested are given below:

Example 1

Read-Modify-Write Operations when Using Error Correction Circuits

In some memory devices it is desired to improve memory integrity and hence, error correction circuits are used. The error correction circuits compute additional data bits, called check bits, and these data bits are then written to a corresponding memory location of a normal data address. When a memory read is done, these additional bits are read as well and they allow the error correction circuits to detect if any of the normal data bits have been modified due to a data error. Every time a portion of a data word stored in the memory needs to be changed these check bits are modified. In some cases a partial word write is done by a user. In such cases the entire memory word is read out, the new portion of the data is combined with the unmodified portion and the check bits are recomputed based on the new data word. The new data and new check bits need to be written back into memory. The combined operation of a memory read, the modification of the data and a memory write to store the data back into the memory is an example of a read-modify-write operation.

Example 2

Read-Modify-Write Operations when Data Mask Pins are Unused

In one or more memory devices it is easy to implement partial word write operation by adding data mask pins to the device. When only a portion of a data word needs to be written to, for example, when a byte write is requested, the other portion of the data word may be masked by setting the devices mask pins to an appropriate state, so that those bits may not be changed. In some cases, the one or more memory devices may not want to dedicate pins for this function as the pins are expensive and the controller may need to do the data masking by implementing a read-modify-write operation whenever a partial word write, like a byte write is requested.

Example 3

Read-Modify-Write Operations for Semaphore Applications

In most electronic systems, for example, computer systems it is important to implement atomic or indivisible, read-modify-write operations to execute semaphore operations. In a semaphore operation a limited computer resource, like a page table or a file table, may be requested by multiple processes. An operating system must be able to check to see if the resource is available and then allocate the resource to the process if it is. An easy way to do this is to have a data word in memory that indicates how many resources are available. The operating system may read the word from a memory, see if the needed resources are available and modify the amount of resources by subtracting (or adding in the case of a resource being returned to the operating system by a process) by the amount of resources required. Since multiple processes compete for the resources and a process might make a request in between the read and the write of a previous processes semaphore operation it is clear that an atomic or indivisible, read-modify-write operation is required.

In an embodiment of the invention, after creating the read request and the write request prioritization is performed to make a write operation happen after a read operation is done. The prioritization may be performed in several ways. An exemplary way of prioritization is explained in detail in step 515.

At step 515, the read access request and the write access request are prioritized. The write operation is prioritized such that the read operation is executed first. The write operation is flagged by clearing an enable bit in the entry for the write operation in the CAM access storage module. For example, if a read access needs to be completed prior to the write operation, the write operation is flagged by clearing the enable bit. The enable bit when cleared removes the write command from consideration during searches for next access. The read operation is stored in a CAM access storage module with some additional bits that identify the read operation as being coupled to the write operation including a write flag bit and the entry location for the associated write command. When the read operation is executed the write flag is detected and the enable bit associated with the write operation is set. The write operation then participates in the search for the next possible access.

At step 520, the read access request and the write access request are executed based on the prioritizing. The read operation is executed by disabling the write operation. Once the read operation is completed, the write operation is detected and set. The write operation then can be further executed.

Figure 6:
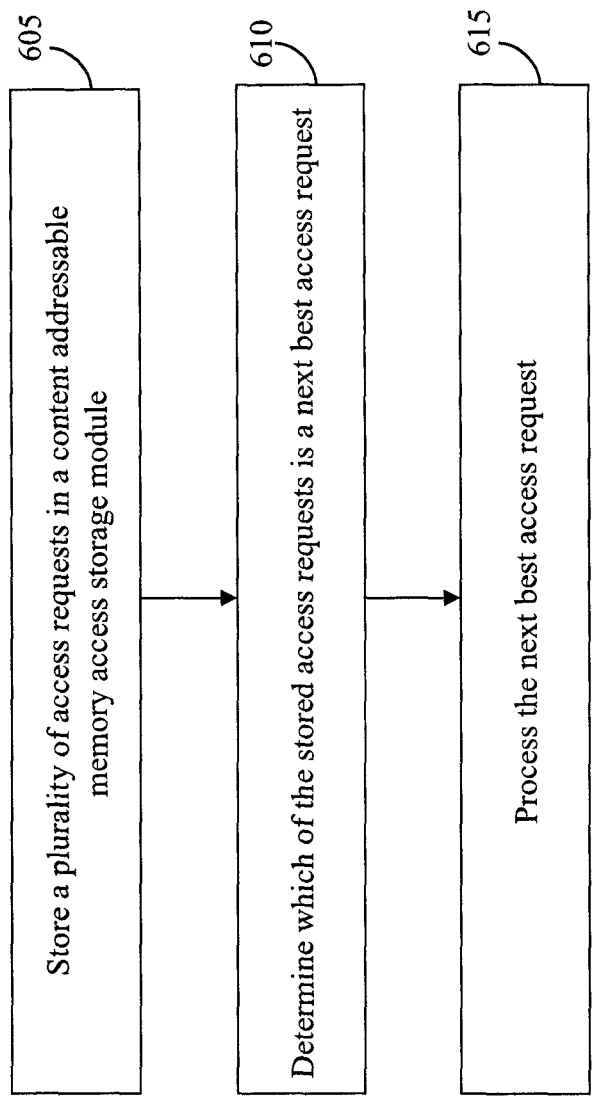
FIG. 6 illustrates a method of accessing a dynamic random access memory (DRAM).

FIG. 6 illustrates a method of accessing a dynamic random access memory (DRAM).

At step 605, a plurality of access requests is stored in a CAM access storage module. Every access requested of the DRAM memory controller for the DRAM is stored in the CAM access storage module. An allocation mechanism used by the CAM based decision control module controls the way in which entries to the CAM access storage module are written into. Initially writes to the CAM are done like a first in first out (FIFO) memory. A first entry is written into a first memory location. A second entry is written into a next memory location. This continues as each new entry is added. Loading entries in this manner allows the algorithm to understand the age of each entry. This is performed as the decision logic module needs to take into account how long the access has been in the memory. In an embodiment, accesses are prevented from aging too much.

The entries can be removed from the CAM in a random order, based on which the best or most efficient access is processed. In an embodiment, one metric for best is how old an access is. Older accesses have higher priority. Special logic is added to the memory so that when multiple accesses match during a search, a selection network determines which entry is oldest, by comparing the entry value of each match to the entry value of the oldest entry. Taking the age of an access into account helps in the determination of the best access. When the oldest entry is removed, the pointer to the oldest entry moves to the next occupied location so that the oldest location is preserved.

At step 610, the next best access request is determined from the stored access requests in the CAM access storage module. The determining includes holding the next best access request for a period of time. A scheduling mechanism implemented by the CAM based decision control module uses the next access table. The CAM access storage module records all accesses that have come into the DRAM memory controller and the next access table holds the best next access on a per bank basis. The next access table is updated on each access by comparing the current best access to any new access that comes in to the CAM based decision control module. If the new access is better, it is loaded into the next access table. If the new access is not better it is simply added to the rest of the accesses in the CAM access storage module.

At step 615, the next best access request is processed. A transaction is serviced using a transaction servicing mechanism. When the DRAM has an available cycle the next best access in the next access table is processed. The entry is read from the memory and processed. In an embodiment, the CAM access storage module contains all the information required to process the transaction. The next access table just holds the minimum information needed to identify the memory entry location and make scheduling decisions and the memory entry is marked as invalid and the next access table is loaded with a new best access. The new best access is determined by doing checking the CAM access storage module for an access request to an open page of a DRAM bank as well as an access request to the DRAM bank. If there is an access to the open page, it takes priority. If there is no access to the open page then an access to the DRAM bank takes priority. If there are multiple accesses within either of these cases the selection logic uses the best determinants to select between the accesses. Examples of best determinants include but are not limited to age, priority, number and order.

In an embodiment, when implementing the above described mechanisms data ordering is performed by maintaining order of the plurality of access requests for the processing. Detection of data collisions and management of the data collisions is also performed.

Proper data ordering needs to be maintained while accesses are being selected for the processing. For example, if a write access request is followed by a read access request to the same storage location it is important not to reorder these accesses so that the read is done prior to the write since incorrect data would be read from the memory. In order to eliminate these re-ordering issues when a read access request is loaded into the CAM access storage module a search is done for a write access request to that same location. If a write access request to that location exists, the read access request must be flagged so that it occurs after the write access request. This is done by stalling the read operation. It is saved and is not allowed to be loaded into the CAM access storage module until after the associated write operation is completed. The associated write operation has its priority reset to be higher than other accesses so that it will be completed sooner, allowing the associated read to uninstall. A similar case is when a read operation is followed by a write it is important that the write not be done prior to the read. In an embodiment, this case is taken care of by doing a search for a read access request to the write location and implementing using a similar method as described above.

The detection of data collisions and management of the data collisions also needs to be taken into consideration. Other cases that can be detected using the CAM occur when reads to the same location follow each other or when writes to the same location follow each other. For example, if a read comes in and a read to that location already exists, the read accesses are processed normally if there is no intervening write. If a write operation comes in and a write operation already exists, the second write operation will overwrite the previous write operation without impacting data integrity if there is no intervening read. If data masking is used to write only certain portions of the data block, then the second write will overwrite only the appropriate portions of the first write, and the resulting data mask will be an OR function of the unmasked bits of both writes. The first write operation can be ignored and is cleared from the access storage module. In an embodiment, if many write operations are being made to the same address a significant savings in memory bandwidth results since only one access request is actually processed.

The efficient DRAM memory controller implementation increases system bandwidth, lowers power consumption, lowers cost, lowers heat dissipation and improves development time. Further, the efficient DRAM memory controller implementation is also useful in systems with smaller amount of die size.

Various embodiments of the present disclosure provide an efficient DRAM memory controller with increased system bandwidth, lower power consumption, lower cost and minimized latency. Further, the DRAM memory controller improves access time and development time.

The foregoing description sets forth numerous specific details to convey a thorough understanding of embodiments. However, it will be apparent to one skilled in the art that embodiments may be practiced without these specific details. Without limitation, an embodiment is a computer program product for accessing a dynamic random access memory (DRAM), the computer program product comprising a computer readable medium bearing program code for directing a computer to store a plurality of access requests in a content addressable memory access storage module; determine which of the stored access requests is a next best access request based on results from the CAM access storage module and the next access table module; and process the next best access request. Some well-known features are not described in detail. Other variations and embodiments are possible in light of above teachings, and it is thus intended that the scope not be limited by this Detailed Description, but only by the claims.

We claim:

1. A dynamic random access memory (DRAM) memory controller for controlling a dynamic random access memory (DRAM), the DRAM memory controller comprising:
   a content addressable memory (CAM) based decision control module, the CAM based decision control module comprising:
   a CAM access storage module;
   a next access table module for storing a current best access to a specific memory bank, the next access table module comprising:
   a bit indicative of whether an entry is to be used;
   a priority bit;
   a page hit bit indicative of whether an access is within an open page; and an index into contents of the CAM access storage module;
a decision logic module for determining a best access using results from the CAM access storage module and the next access table module; and
a DRAM access control interface.

2. The DRAM memory controller of claim 1, wherein the CAM based decision control module determines a next best access request for the DRAM.

3. The DRAM memory controller of claim 1, wherein the CAM access storage module comprises a register having enough storage bits to receive and store an access request and a read operation.

4. The DRAM memory controller of claim 3, wherein the CAM access storage module further comprises a write flag bit and an entry location for an associated write command.

5. The DRAM memory controller of claim 1, wherein the next access table module stores a next best access request.

6. The DRAM memory controller of claim 5, further comprising circuitry for updating the next access table module, responsive to a new access request, by comparing the new access request to the current best access stored in the next access table module.

7. The DRAM memory controller of claim 1, wherein the decision logic module performs at least one of:
determining a next best access request based on results from the CAM access storage module and the next address table module;
detecting a read-modify-write operation; and
creating a read access request and a write access request.

8. The DRAM memory controller of claim 7, wherein the decision logic module determines the next best access request based on at least one of:
age of an access stored in the CAM access storage module,
order of accesses stored in the CAM access storage module,
the number of accesses to an open bank of memory, and
priority of the accesses stored in the CAM access storage module.

9. The DRAM memory controller of claim 1, wherein the DRAM access control interface implements signaling required to access the DRAM.

10. The DRAM memory controller of claim 9, wherein the DRAM access control interface includes circuitry for creating signals and timing to control read and write process to the DRAM.

11. The DRAM memory controller of claim 1, wherein the CAM based decision control module is coupled to a user interface.

12. The DRAM memory controller of claim 1, wherein the CAM based decision control module optimizes an access stream.

13. The DRAM memory controller of claim 1, wherein the CAM based decision control module issues accesses to the DRAM access control interface.

14. The DRAM memory controller of claim 1, further comprising an interface for coupling the DRAM access control interface to a DRAM.

15. The DRAM memory controller of claim 1, further comprising a module for providing an access mechanism, and for implementing timing and control functions for a DRAM.

16. The DRAM memory controller of claim 1, further comprising a DRAM scheduler.

17. The DRAM memory controller of claim 1, wherein the decision logic module is a next table decision logic module.

18. The DRAM memory controller of claim 1, wherein the CAM access storage module comprises:
a bit indicative of whether an entry is used or not;
address bits indicative of a complete memory address;
a tag bit indicating an order of a requested read operation;
a priority bit; and
next table information.

19. A method of controlling a dynamic random access memory (DRAM) using a DRAM memory controller which comprises a content addressable memory (CAM) based decision control module, the CAM based decision control module including a CAM access storage module, the method comprising:
detecting a request for a read-modify-write operation;
creating a read access request and a write access request based on the detecting;
prioritizing the read access request and the write access request; and
executing the read access request and the write access request based on the prioritizing;
wherein the prioritizing comprises:
clearing an enable bit within the CAM access storage module, the enable bit being associated with a write operation, to disable the write operation; wherein the CAM access storage module further comprises next table information including:
a bit indicative of whether an entry is to be used;
a priority bit;
a page hit bit indicative of whether an access is within an open page; and
an index into contents of the CAM access storage module;
storing a read operation with additional bits, wherein the additional bits comprise a write flag bit and entry location for the write operation;
performing the read operation;
detecting the write flag;
setting the enable bit associated with the write operation; and
executing the write operation.

20. A computer program product for controlling a dynamic random access memory (DRAM) using a DRAM memory controller which comprises a content addressable memory (CAM) based decision control module, the CAM based decision control module including a CAM access storage module, the computer program product comprising a non-transitory computer-readable medium and instruction carried by the medium operative to cause a computer to perform
detecting a request for a read-modify-write operation;
creating a read access request and a write access request based on the detecting;
prioritizing the read access request and the write access request; and
executing the read access request and the write access request based on the prioritizing;
wherein the prioritizing comprises:
clearing an enable bit within the CAM access storage module, the enable bit being associated with a write operation, to disable the write operation; wherein the CAM access storage module further comprises next table information including:
a bit indicative of whether an entry is to be used;
a priority bit;
a page hit bit indicative of whether an access is within an open page; and
an index into contents of the CAM access storage module;

storing a read operation with additional bits, wherein the additional bits comprise a write flag bit and entry location for the write operation;
performing the read operation;
detecting the write flag;
setting the enable bit associated with the write operation; and
executing the write operation.

* * * * *